G. MOONEY.
Egg-Beater.

No. 204,498. Patented June 4, 1878.

WITNESSES:
Joseph A. Miller Jr.
William B. Roof

INVENTOR:
George Mooney
by Joseph A. Miller
Attorney

UNITED STATES PATENT OFFICE.

GEORGE MOONEY, OF PROVIDENCE, RHODE ISLAND.

IMPROVEMENT IN EGG-BEATERS.

Specification forming part of Letters Patent No. 204,498, dated June 4, 1878; application filed May 15, 1878.

*To all whom it may concern:*

Be it known that I, GEORGE MOONEY, of the city and county of Providence and State of Rhode Island, have invented certain new and useful Improvements in Egg-Beaters; and I hereby declare that the following is a full, clear, and exact description of the same, reference being had to the accompanying drawings, forming part of this specification.

This invention has reference to improvements in the agitators or mixers of egg-beaters, churns, clay-mixers, and other machines or apparatus in which matter is to be thoroughly intermixed in the shortest time and with the least expenditure of force; and the invention consists in the peculiar arrangement and form of the wings of the agitator or mixer, as will be more fully described hereinafter, and pointed out in the claims.

Figure 1:
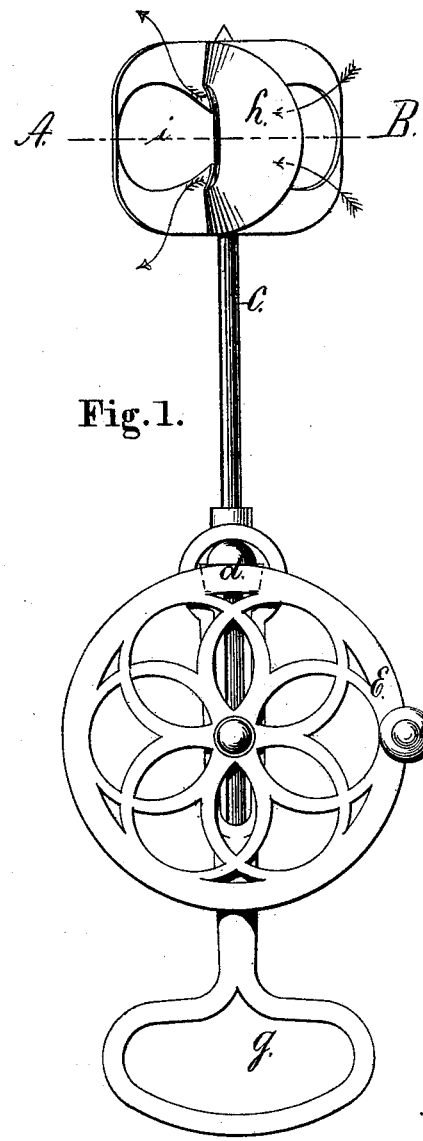
Figure 2:
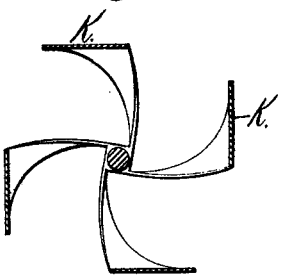
Figure 3:
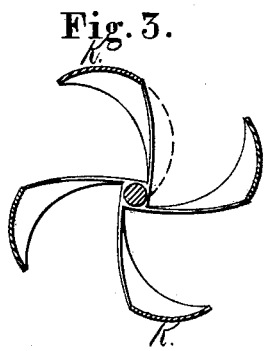

Figure 1 represents my improved egg-beater. Fig. 2 is a sectional view, through the line A B, of the mixer. Fig. 3 is a sectional view, through the line A B, of a slightly-modified form of the mixer.

In the drawings, C is a shaft, secured in bearings, and provided with a beveled pinion, $d$, by which the shaft is rotated through the gear $e$ by the handle $f$, the whole being firmly held by the hand-loop $g$, thus forming the old and well-known driving end of various kinds of egg-beaters.

$h\ h$ are cup-shaped beaters or wings, in the center of which an opening, $i$, widest nearer the shaft, is left. $k$, Figs. 2 and 3, represents the line through the center of the wings $h$, at A B, which may be straight, as shown in Fig. 2, or curved, as in Fig. 3.

By rotating the mixer, the cup-shaped wings will force the fluid or semi-fluid mass in which they revolve through the openings $i$, and discharge the same from the upper and lower portions of the wings, while the central and most projecting portion draws the fluid or semi-fluid mass into the mixer, producing a peculiar and most effective vortex motion, by which the whole mass is gradually drawn into and through the beaters, and is thus thoroughly mixed.

The churning of milk and the beating up of eggs, although apparently different in the action and result, are identical, in that in both cases small globules of albumen film containing oil are to be broken up—in the milk, to unite as butter, and in the egg, to be thoroughly mixed with the albumen of the white and produce a light, rich, foamy mass. The breaking up of these globules is best and easiest accomplished by breaking the envelope by friction rather than by a chopping action, so as to release the oil without destroying the film.

My improved mixer or beater, by its compound action on the mass, drawing the same in and forcing the same through the concentrated central apertures, and forcibly expelling the same upward and downward, as shown by the arrows in Fig. 1, produces so much friction on the globules that they are rapidly broken, and the whole mass, by alternate concentration and expansion, produced by the peculiar cup-shape form of the wings $h$ and the opening $i$, forms a light, foamy mass in less time than was heretofore possible.

In beating eggs, to produce the best possible result air must be carried into the semi-liquid mass to aerate the same and produce the light and foaming froth, by holding the air in the fine albumen films.

With beaters arranged to cut and stir the eggs little or no air can enter into the mass and be retained by the same; and eggs so beaten are inferior to eggs beaten with the old hand-beater, in which the mass was partially raised, but which requires great strength and some skill.

With my improved rotating vortex beater a large quantity of air is drawn in by the revolving wings, and is mixed with the eggs as the whole is forced through the holes $i$, and expelled from the beater by the centrifugal force. This air is retained by the albumenous films, and produces the light, foamy mass so much desired by cooks, housekeepers, and confectioners, and which produces, when baked, the light, wholesome, and rounded cakes admired by all.

Having thus described my invention, I claim as new and desire to secure by Letters Patent—

1. A mixer-head consisting of two or more cup-shaped wings, $h$, provided with the aperture $i$, and means for rotating the same, substantially as and for the purpose described.

2. The combination, with the revolving shaft $c$, of curved wings $h$, secured to the shaft and provided with openings $i$, arranged and operating substantially as and for the purpose set forth.

GEORGE MOONEY.

Witnesses:
JOSEPH A. MILLER,
JOSEPH A. MILLER, Jr.